United States Patent [19]
Hinkley

[11] Patent Number: 5,092,047
[45] Date of Patent: Mar. 3, 1992

[54] MANUAL CHAIN SAW

[76] Inventor: J. Ross Hinkley, 557 East Mall, Apartment 605, Etobicoke, Ontario M9B 4A5, Canada

[21] Appl. No.: 695,722

[22] Filed: May 6, 1991

[51] Int. Cl.⁵ .................. B27B 21/00; B27B 33/14
[52] U.S. Cl. ................................. 30/166.3; 83/830
[58] Field of Search .............. 30/166.3; 83/830-834

[56] References Cited

U.S. PATENT DOCUMENTS

| | | | |
|---|---|---|---|
| 4,193,188 | 3/1980 | Johnson | 30/166.3 |
| 4,240,203 | 1/1980 | Johnson | 30/166.3 |
| 4,242,796 | 4/1981 | Barausch et al. | 30/166.3 |
| 4,344,229 | 3/1982 | Johnson | 30/166.3 |
| 4,518,022 | 5/1985 | Valdos et al. | 30/166.3 |

Primary Examiner—Douglas D. Watts
Attorney, Agent, or Firm—Saperston & Day

[57] ABSTRACT

This invention relates to a saw for cutting remote tree limbs or other wood pieces from ground level. The saw consists of a segment of a standard chain saw blade attached to ropes held by the operator in each hand. An apparatus for lifting one end of the saw over the workpiece is also disclosed. Proper placement of the saw blade on the workpiece is facilitated by use of roller beads, to minimize snagging, and a tipping device that ensures proper orientation of the saw blade. Handles are attached to the rope ends for ease in operation.

6 Claims, 2 Drawing Sheets

MANUAL CHAIN SAW

FIELD OF INVENTION

This invention pertains to a manually-operated flexible saw for cutting tree branches and other remote workpieces.

BACKGROUND OF INVENTION

Manually-operated flexible saws generally are comprised of a series of pivotally-connected cutting teeth in sufficient number to engage a tree limb or other workpiece, connected at each end to ropes or other equivalent means of pulling the saw teeth back and forth over the workpiece from a remote location on the ground. The major distinction between flexible saws and conventional hand saws is the absence of a rigid saw blade. The advantage of the flexible saw is the ability to perform sawing operations on remote tree limbs without the dangers associated with climbing a tree. The disclosed invention improves the known art to achieve a cost-effective apparatus that can be operated efficiently. An objective of the invention is to utilize a standard chain saw blade for cost-efficiency reasons. Examples of prior art such as Prusinski, U.S. Pat. No. 2,752,964; Barausch et al., U.S. Pat. No. 4,242,796; and Meadows, U.S. Pat. No. 3,747,652, all teach a custom-manufactured cutting mechanism. The present invention eliminates the extra cost of custom manufacturing by utilizing a standard flexible linkage chain saw blade, such as the known "Oregon" type. Use of standard materials is also cost effective from a maintenance (sharpening) and replacement standpoint.

One problem not resolved by prior art is the proper positioning of the blade on the workpiece. An important element of sawing with a flexible blade is the positioning of the blade on the workpiece in such a way as to achieve maximum results from the initial downward pulls. Proper positioning is often difficult to achieve, because the operator cannot manually place the saw blade in proper position from his remote location. Often, a segment of rope close to the blade often becomes snagged on bark or wedged within the juncture of the branch and tree trunk. Friction and snagging is minimized with the present invention by use of a string of roller beads near the blade at the point of engagement with the workpiece. Roller beads are substantially spherical objects strung over the rope loosely so as to permit the beads to roll around the axis of the rope.

Another problem associated with blade orientation is the position of the cutting teeth on the workpiece. Flexible link sawing teeth will assume a vertical plane when draped over a tree limb. The links will remain in that orientation when oscillated over the workpiece by force of the operator alternately pulling on the ends of the ropes. However, it is important to position the blade with the cutting teeth opposing the workpiece. Barausch and Prusinski teach cutting blades that operate in either orientation but suffer from the cost and efficiency factors mentioned above. Johnson, U.S. Pat. Nos. 4,240,203 and 4,344,229, teaches a counterweight that facilitates assumption of an untwisted vertical plane when draped over the workpiece but does not ensure proper placement of the cutting teeth in opposition to the workpiece. This often requires multiple attempts to position the blade properly. The present invention discloses a tipping device containing a rigid flag member that tips the saw blade into proper orientation if initial placement results in the cutting mechanism pointing away from the workpiece. The roller beads assist in vertical and horizontal movement of the apparatus over the workpiece, thereby easily achieving proper placement of the tipping device and saw blade.

Other improvements that facilitate ease of operation are adjustable ropes combined with handles or other equivalent means for grasping the ropes to maximize the efficiency of the alternating downward pulls by the operator. Cutting can be achieved at any angle and at a safe distance from the workpiece. An adjusting block on each rope permits the ropes to be shortened or lengthened as necessary, thereby preventing the unrequired length of rope from accumulating on the ground at the feet of the operator, thus minimizing the potential hazard of entanglement with the operator's feet during normal operation or a retreat from falling debris. This invention also discloses a pole and hook for placing the saw over the workpiece more efficiently than with the forked pole taught by Barausch or by using the counterweights taught in Johnson to help in throwing one end of the saw over the workpiece. The hook is of a U-shaped configuration that allows the operator to drop one end of the saw over the workpiece by merely rotating the pole.

SUMMARY OF THE INVENTION

The invention improves known flexible saws. Flexible saws when strung out contain an array of elements serially connected in a line. All such line saws contain three essential elements—a first segment of rope connected to a second, shorter segment of pivotally connected cutting teeth, which in turn is connected to a third segment of rope of substantially equal length to the first segment. The operator holds one rope end and drapes the other end over the workpiece such that the saw blade rests upon the workpiece. The operator then holds the other rope end in his other hand and oscillates the saw blade over the workpiece by alternating pulls on the rope ends.

The present invention improves known flexible saws to achieve easier and more efficient operation. Roller beads and a tipping device assure easy placement and proper orientation of the saw blade on the workpiece. The roller beads allow the operator to make subtle vertical and horizontal adjustments of the rope when draped over a tree limb. The tipping device positions the saw blade properly in opposition to the workpiece for commencement of sawing. Handles, when used in conjunction with adjustable ropes, permit the operator to grasp the saw firmly in a manner that permits the maximization of the manual alternating stroking activity required to saw the workpiece. In the preferred embodiment, the entire saw is approximately 65 feet long, thereby permitting the sawing of tree branches up to 30 feet off of the ground. Rope lengths can be longer or shorter, depending on the usual nature of the operator's cutting activities, but efficiency and ease of operation reduces as the distance between the operator and the workpiece increases. A saw blade 30 inches long is ideal for cutting workpieces up to approximately 12 inches in diameter. Longer blades can be used on larger workpieces, but efficiency decreases as the diameter of the workpiece increases.

Although the invention as shown is used on a remote workpiece such as a tree limb, the disclosed saw can also be used in ground-level applications, such as camping where access to electricity or limitations on portable equipment do not allow the use of motorized saws. The entire apparatus is flexible enough to roll up on a spool for storage and adaptable enough to be used as a "camp saw" for stumps, exposed roots, or other wood pieces on the ground or underwater, as well as on remote tree limbs above or beyond the operator.

The utility of the sawing apparatus can be enhanced by modifying a standard chain saw blade to arrange the cutting teeth in two segments, each having teeth facing in opposite directions, to allow sawing to occur with down strokes on either end. When the cutting teeth are all facing one direction, actual cutting occurs every other stroke. By modifying the sawing links by separating a saw blade in the middle, then reconnecting it after flipping one segment over to reverse the direction of the cutting teeth, greater efficiency can be achieved. Not only is sawing made faster, but a broader surface is cut around the circumference of the workpiece thus preventing binding of the saw blade in the cutting field due to the force of gravity on the branch which pinches the blade.

DETAILED DESCRIPTION OF THE PREFERRED EMBODIMENT

Figures 1, 2:
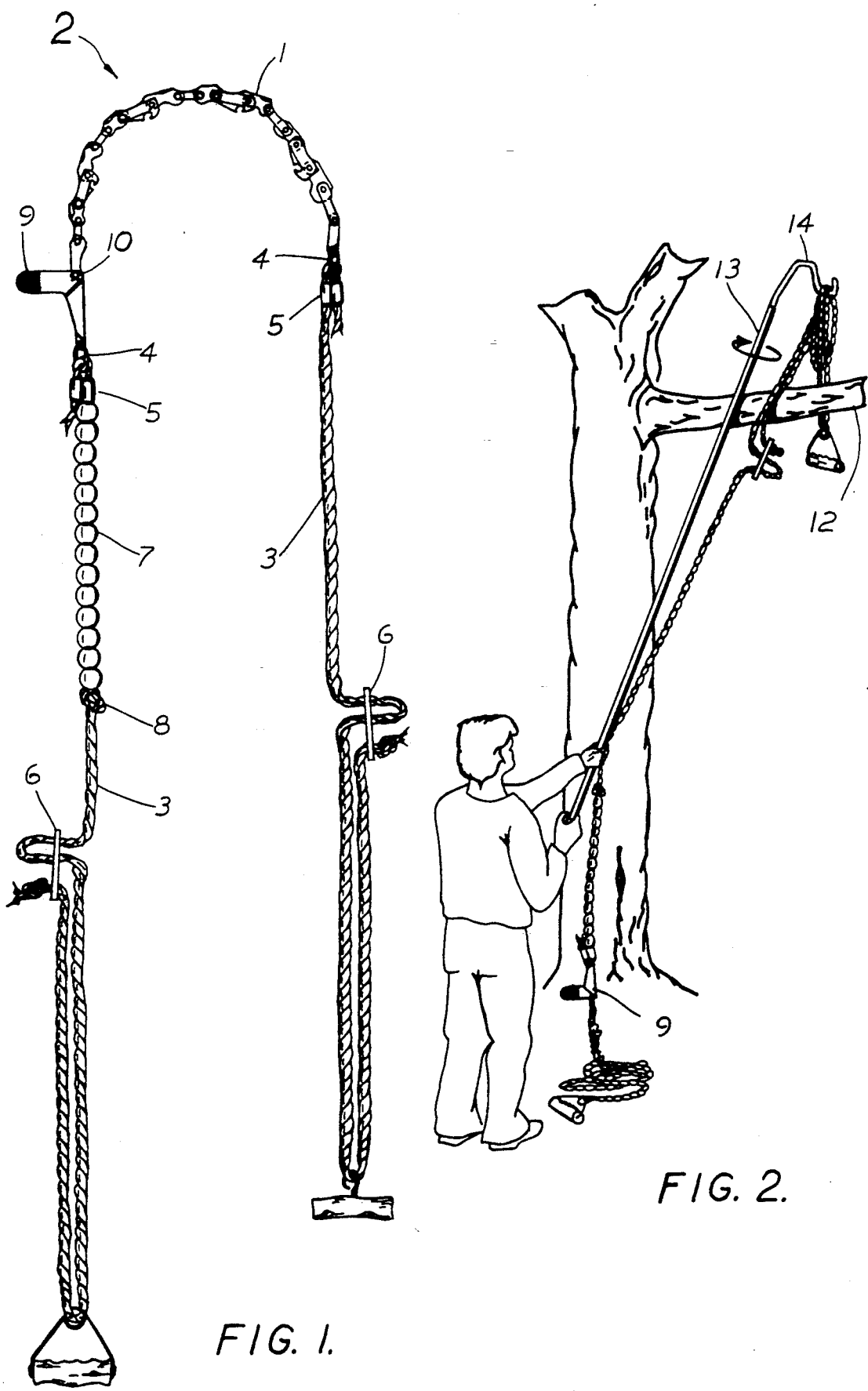
FIG. 1 is a view of the saw apparatus in its entirety.
FIG. 2 is a representation of the means of positioning the saw over the workpiece by means of a pole and hook apparatus.

FIG. 1 shows the cutting apparatus as a whole. A plurality of flexible cutting links 1 of known design are pivotally attached to form a saw blade 2. Ropes 3 or other equivalent extension means are attached to the saw blade ends by means of a harness ring 4 and sleeve clamp 5. The length of the ropes is adjustable by means of adjusting blocks 6. Roller beads 7 of sufficient quantity to drape over a workpiece are strung over one of the ropes and secured by a knot 8. A tipping device 9 is attached to the end of the roller beads and secured to the saw blade by a fastening means 10. The ropes 3, which have been adjusted to proper length as dictated by the position of the operator in relation to a workpiece, are looped through a grasping means 11 and secured at the adjusting block 6.

As shown in FIG. 2, one end of the saw can be lifted over a workpiece 12 by means of a pole 13 and hook 14 assembly that can be rotated to drop the apparatus at the desired point.

Figure 3:
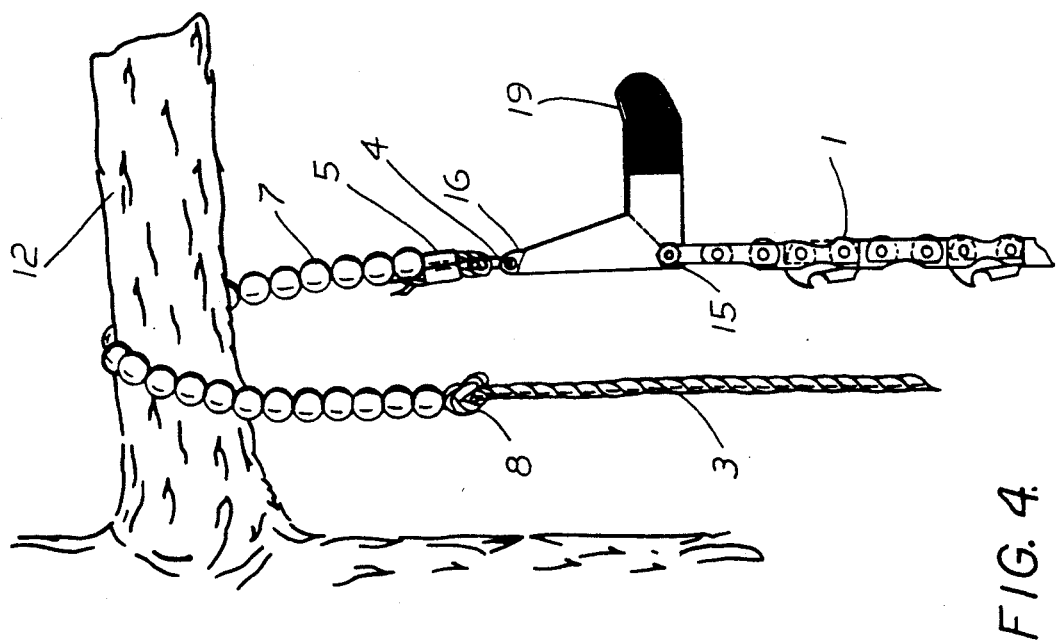
FIG. 3 is a detailed view of the tipping device.

A detailed view of the tipping device 9 is shown in FIG. 3. The device, including a base 15 and two sides 18, is tapered from a narrow end 16 to a wide end 17. One of the sides extends into a flag member 19.

Figure 4:
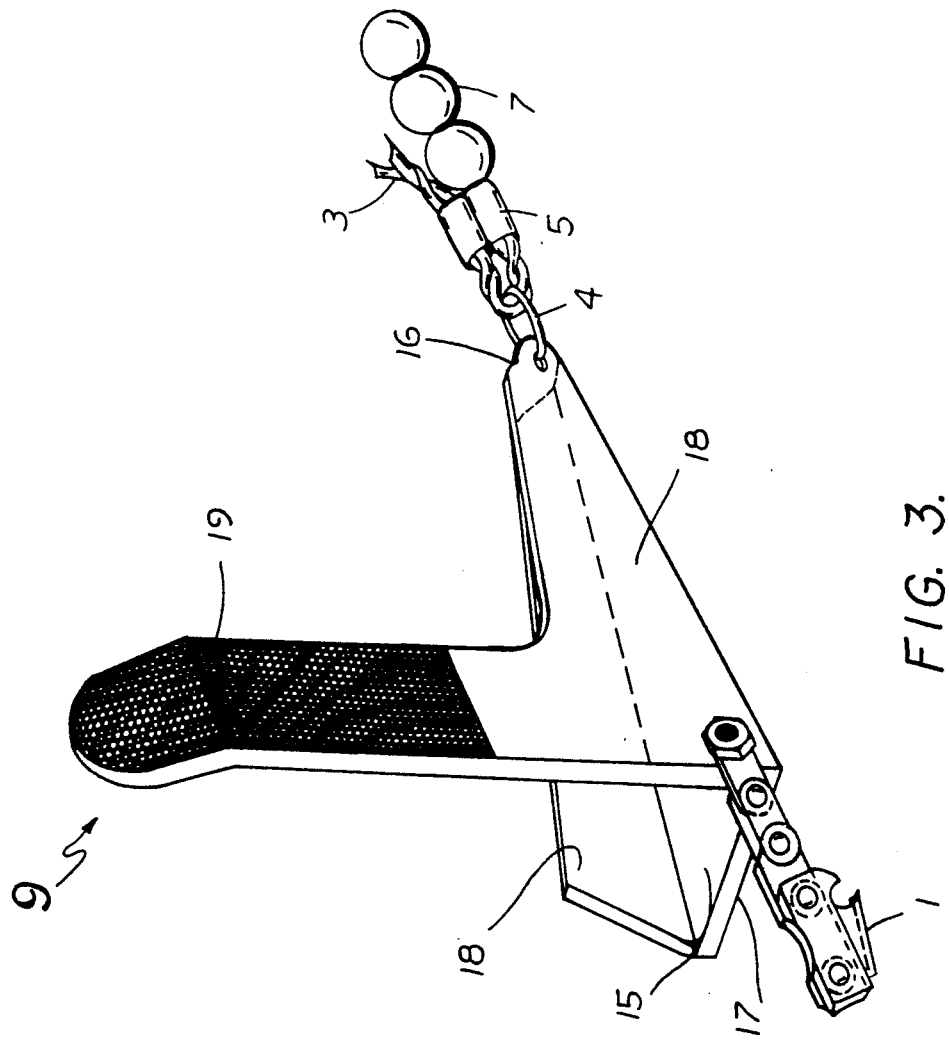
FIG. 4 shows the roller beads, tipping device, and saw blade in position for cutting a tree limb workpiece.

FIG. 4 shows the roller beads 7 draped over the workpiece 12 in position to be manipulated by the operator. The roller beads assist the operator in engaging the narrow end 16 of the tipping device at the point of desired contact on the workpiece and bringing the base 15 of the tipping device to rest upon the workpiece. When said base rests upon the workpiece, the saw blade is automatically positioned properly for cutting with cutting teeth 1 opposing the workpiece. If the tipping device engages the workpiece in any other orientation, the flag member 19 strikes the workpiece and flips over the tipping device to assume the proper orientation. In the event the flag member does not achieve the desired tipping effect on the first pass, subsequent attempts to manipulate the saw are facilitated by use of the roller beads to move the saw vertically or horizontally along the workpiece. When the tipping device is properly engaged at the workpiece, the flag member 19 stands erect as a signal to the operator that the blade is in proper position for commencement of sawing. In the preferred embodiment, the flag member is painted red or some other bright color to enable the operator to determine from his remote location that the saw blade is in the proper position for sawing.

Having thus described the within invention, I claim:

1. A flexible line saw for sawing tree limbs comprising:
   a first grasping means;
   a first extension means connected to said grasping means, said extension means including a means for adjusting the length of the extension means;
   an orienting means connected to said first extension means, said orienting means including a base and a rigid flag member extending perpendicularly from said base whereby said flag will rotate 180 degrees to assume a vertical upward position when pulled in opposition to a workpiece;
   a flexible saw blade connected to said orienting means, said saw blade comprised of cutting links pivotally attached in a series;
   a second extension means connected to said saw blade, said second extension means of substantially the same configuration as the first extension means; and
   a second grasping means connected to the second extension means.

2. The saw in accordance with claim 1 wherein a plurality of roller beads is connected between the second extension means and the tipping device.

3. The saw in accordance with claim 1 wherein the saw blade is a chain saw blade.

4. The saw in accordance with claim 1 wherein said cutting links comprise two substantially equal lengths, each of said lengths containing sawing teeth oriented in an opposite direction from the other length.

5. A cutting system for remote workpieces comprising the saw in accordance with claim 1 and a means for placement of said saw on a workpiece,
   said means comprising a pole and a hook,
   said hook of a U-shaped configuration whereby the saw will slip off of the hook by rotation of the pole.

6. The device of claim 5 wherein:
   a first section of the hook extends from the top of the pole in a forward plane;
   a second section of the hook extends downward in said forward plane;
   a third section of the hook extends substantially perpendicular to said forward plane; and
   a fourth section of the hook extends upward.

* * * * *